United States Patent [19]

Osada

[11] Patent Number: 5,291,464
[45] Date of Patent: Mar. 1, 1994

[54] SPEED AND POSITION CONTROL APPARATUS FOR POSITIONING A MOVABLE OBJECT

[75] Inventor: Yutaka Osada, Fujisawa, Japan

[73] Assignee: Victor Company of Japan, Ltd., Yokohama, Japan

[21] Appl. No.: 903,399

[22] Filed: Jun. 24, 1992

[30] Foreign Application Priority Data

Jun. 25, 1991 [JP] Japan .................................. 3-180150
Jun. 25, 1991 [JP] Japan .................................. 3-180151

[51] Int. Cl.$^5$ ...................... G11B 17/22; G11B 33/02; G11B 7/00
[52] U.S. Cl. .................................. 369/32; 369/44.25; 369/44.28; 369/54; 369/44.34; 360/78.04; 360/78.05; 360/78.07; 360/78.11
[58] Field of Search ............... 360/77.02, 77.05, 77.08, 360/78.04, 78.05, 78.06, 78.07, 78.08, 78.09, 78.11; 369/32, 44.29, 44.34, 44.35, 44.43, 44.25, 44.28; 318/560, 632

[56] References Cited

PUBLICATIONS

"An electronic tach for disk file motion control" by R. K. Oswald, IEEE Trans. on Magnetics, vol. MAG-11 No. 5, Sep. 1975.
"Design of a disk file head-positioning servo" by R. K. Oswald, IBM, J. Res. Develop. Nov. 1974.

Primary Examiner—Robert J. Pascal
Assistant Examiner—Arnold Kinkead
Attorney, Agent, or Firm—Lowe, Price, LeBlanc & Becker

[57] ABSTRACT

A speed and position control apparatus comprising: an encoder generating two-phase signals having a 90-degree phase difference to correspond to a movement of a carrier; and adder obtaining a sum of phase signals; a subtracter obtaining a subtraction of phase signals; a circuit making bi-leveled signals from the sum and subtraction signals; a circuit obtaining an exclusive OR signal based on the bi-leveled signals; a circuit generating differential signals of respective phase signals; a first selector selecting either of the differential signals by the exclusive OR signal; a first switch selectively outputting an output of the first selector or its opposite-polarity output signal based on the bi-leveled subtraction signal; a second selector selecting either of the respective phase signals by the exclusive OR signal; a second switch selectively outputting an output of the second selector or its opposite-polarity output signal based on the bi-leveled subtraction signal; a device inputting an AC component of the second switch output signal to a sample and hold circuit; and a device returning an output of the sample and hold circuit, which holds a sample value inputted during a predetermined period of time in response to a building-up of the exclusive OR output signal, to its input terminal so as to realize a DC restoration.

6 Claims, 8 Drawing Sheets

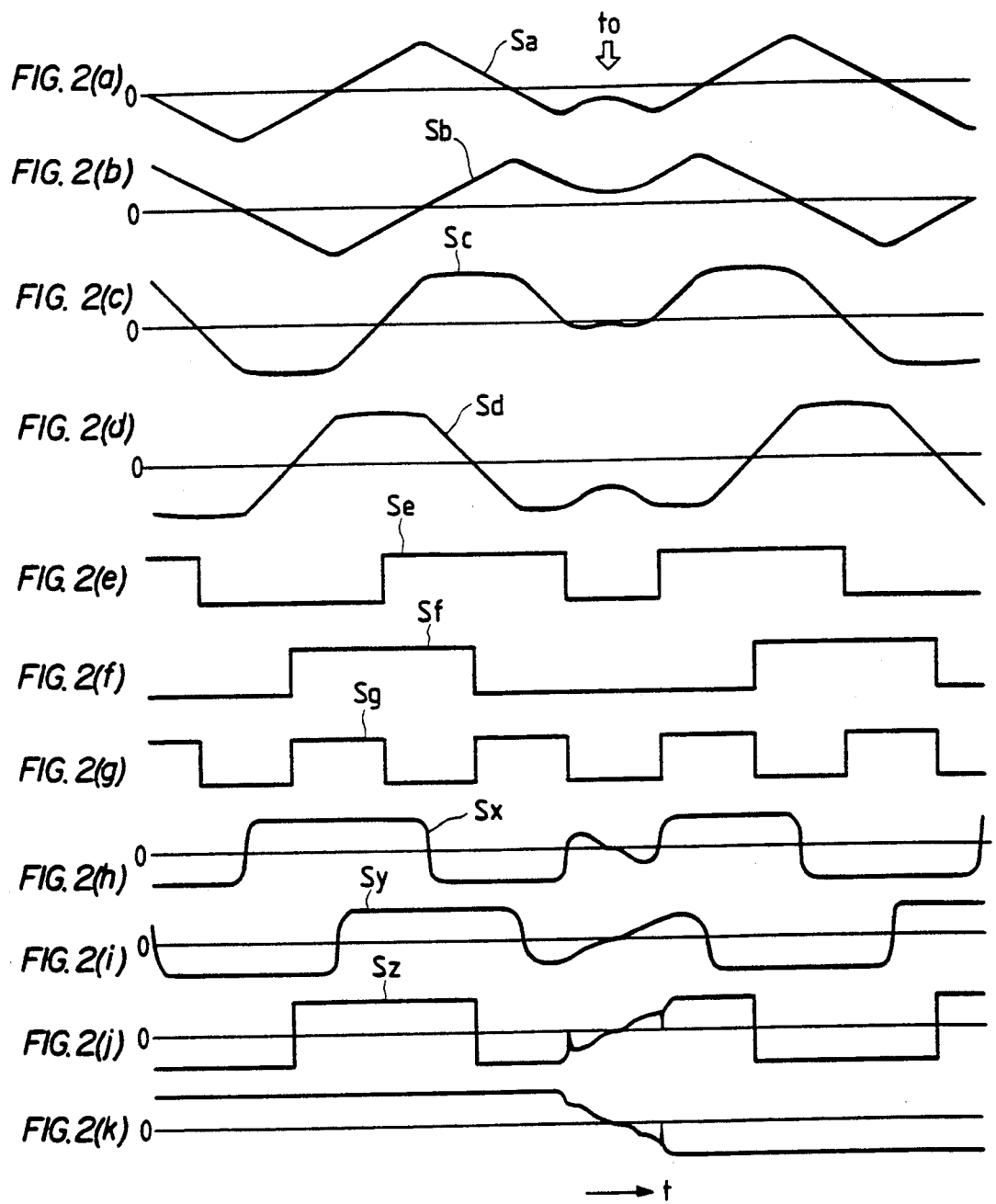

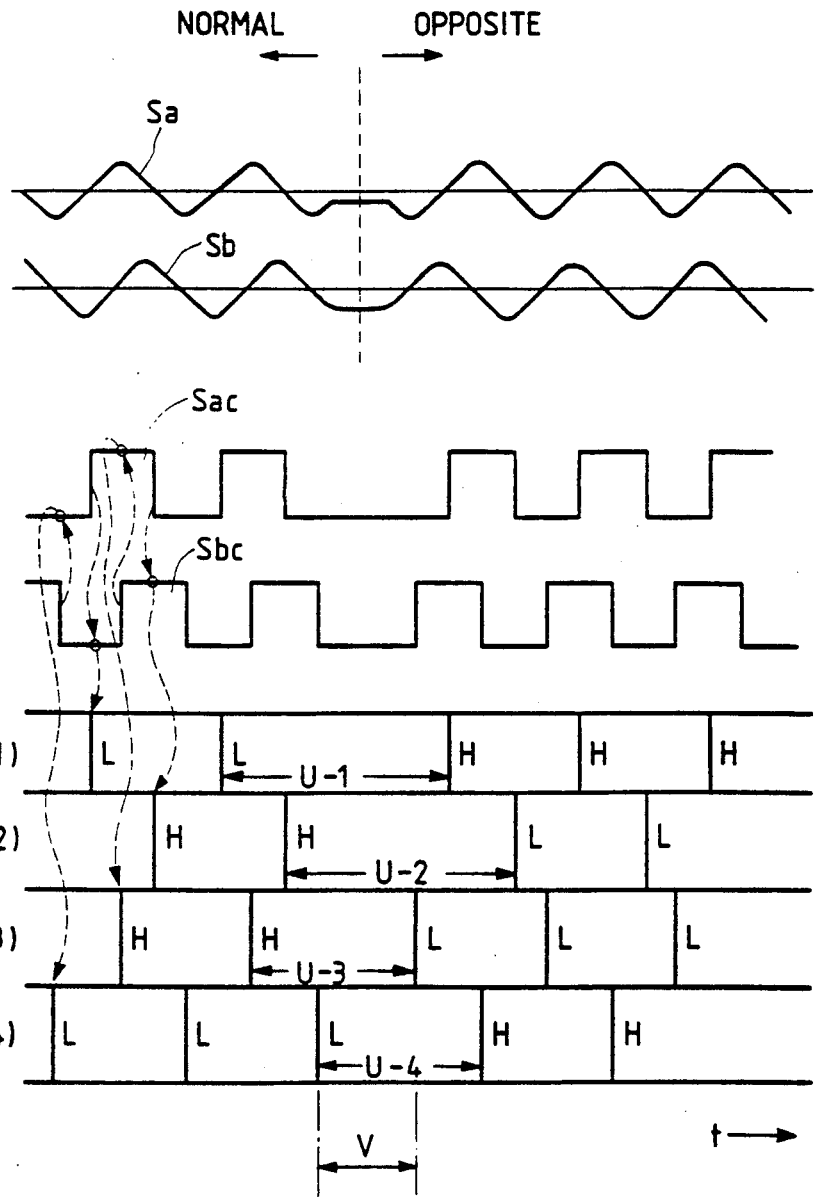

SPEED AND POSITION CONTROL APPARATUS FOR POSITIONING A MOVABLE OBJECT

BACKGROUND OF THE INVENTION

1. Field of the Invention:

The present invention relates to a speed and a position control apparatus, and more particularly to a speed and a position control apparatus suitable for positioning a movable object such as a recording/reproducing element in a recording/reproducing apparatus.

2. Description of the Prior Art:

A control for positioning a movable object to a specific place has been carried out in various technical fields. For example, in the case where information signals are recorded into an optical disk or a magnetic disk or, to the contrary, the recorded information are reproduced from the optical disk or the magnetic disk, the recording/reproducing operation is normally carried by recording the information to a predetermined position of the disk and, in turn, the recorded information is searched for a reproduction. In such a case, it is necessary to accurately position a recording/reproducing element such as an optical head or a magnetic head to a target position within a short period of time.

FIG. 4 is a perspective view showing a recording/reproducing apparatus of an optical disk embodied as one example of a recording/reproducing apparatus. In FIG. 4, a reference symbol M denotes a motor causing a driving force for turning a disk. A reference numeral 1 denotes an optical disk, and a reference numeral 2 denotes a carriage. A reference numeral 5 denotes a lens provided on an optical head, and a reference numeral 6 denotes a magnetic path member for a linear motor. A reference numeral 7 denotes an actuating coil for a linear motor.

When information signal is recorded into the optical disk or the recorded information is reproduced from the optical disk 1, the motor M is actuated to rotate at a predetermined speed. In order to promptly position a condensing point of a recording light or a reproducing light focused by the lens 5 to a target track position on the optical disk 1, a speed control signal and a position control signal are successively supplied to the actuating coil 7 of the linear motor in response to both a target position signal given from a controller (not shown) and a position signal outputted from a position detecting device in accordance with a mutual distance of an optical scale (a linear scale) installed on a movable portion and a detector fixed to a non-movable portion.

Upon receipt of the speed control signal and/or the position control signal, the linear motor shifts the carriage 2 along guide rods so as to promptly and accurately position the condensing point of the recording/reproducing light focused by the lens 5 of the optical head to the target track position on the optical disk 1 in compliance with a seeking operation using a predetermined speed control mode, followed by a predetermined position control operation.

By the way, the speed control system in such a conventional apparatus was equipped with an encoder consisting of an optical scale and a detecting device for executing a speed control and/or a position control for a movable object. This encoder generates false sine-wave two-phase signals having a 90-degree phase difference with each other. These two-phase signals are differentiated and, in turn, added with each other. Then, a low-pass component of the added signal is used as a speed control signal.

FIG. 5 is a view illustrating a procedure for generating a speed signal in a conventional apparatus. Signals shown by (a), (b) of FIG. 5 show false sine-wave two-phase signals Sa, Sb which are generated in the encoder and have a 90-degree phase difference with each other, respectively. Signals shown by (c), (d) of FIG. 5 show signals Sa', Sb' which are absolute differentiated values of the false sine-wave two-phase signals Sa, Sb. Furthermore, a signal shown by (e) of FIG. 5 is a summation of two absolute differentiated signals Sa', Sb'. And, a signal shown by (f) of FIG. 5 is a speed signal Ss obtained by processing the summation signal of the two absolute differentiated signals Sa', Sb' through a low-pass filter.

However, thus obtained speed signal Ss has a disadvantage in that it has no information relating to a moving direction of the carriage.

Signals (a), (b) of FIG. 6 show a condition of the detecting signals Sa, Sb in the case where a shifting direction of a head is changed to an opposite direction. Signals Sac, Sbc shown by (c), (d) of FIG. 6 are obtained after comparing the detecting signals Sa, Sb with their mean values. A signal (e)−(1) shows a level when the signal Sbc is latched by the front edge of the signal Sac, and a signal (e)−(2) shows a level when the signal Sbc is latched by the rear edge of the signal Sac. Similarly, a signal (e)−(3) shows a level when the signal Sac is latched by the front edge of the signal Sbc, and a signal (e)−(4) shows a level when the signal Sac is latched by the rear edge of the signal Sbc.

In this case, if the level values of the signals (e)−(1) through (e)−(4) are changed in specific regions shown, for example, by U-1, U-2, U-3, and U-4, this shows that the shifting direction of the head is changed in a region V which is a common region of these U-1, U-2, U-3, and U-4 regions. A length of the region V corresponds to ¼ of a period of the signal outputted from the encoder. In other words, a resolution of this conventional method for detecting a turning point of the moving direction is recognized as ¼ of the period of the signal outputted from the encoder. Therefore, it was difficult to finely detect the turning point.

Furthermore, a position signal used for a position control in a conventional apparatus is only one of the above-described false sine-wave two-phase signals having a phase difference of approximately 90 degrees. FIG. 9 is a view illustrating a position detecting operation in a conventional apparatus. In FIG. 9, portions circled and indicated by arrows show intersections of a reference voltage $V_{ref}$ and a position control signal; i.e. a stable point for the positioning operation.

In the case where the position control is carried out by using only one of two-phase signals as shown in FIG. 9, the stable point for the positioning operation exists at every pitch of the encoder and the position signal (an error signal for a position control) generated in the encoder has a cyclic tendency. Therefore, the pull-in range of the position control is only a half pitch of the encoder signal.

Especially, it is recognized such a phenomenon that the shorter the cycle (displacement) becomes the smaller the holding torque becomes. Accordingly, if it is adopted for the position control of the carriage 2 in the recording/reproducing apparatus as shown in FIG. 4, positioning the carriage 2 to a target position after seeking operation becomes difficult as the pitch of the encoder becomes small.

SUMMARY OF THE INVENTION

The present invention has a purpose, in view of above problems and disadvantages encountered in the prior art, to provide a speed and position control apparatus for positioning a movable object capable of solving such problems and disadvantages.

To accomplish above purpose, a first aspect of the present invention provides a speed control apparatus for positioning a movable object comprising: a signal generating means for generating false sine-wave two-phase signals having a phase difference equal or close to 90 degrees with each other so as to correspond to a movement of a movable member to be speed-controlled; an adding means for obtaining a sum signal of respective phase signals generated in said signal generating means; a subtracting means for obtaining a subtraction signal of respective phase signals generated in said signal generating means; a comparing means for making bi-leveled signals by comparing said sum signal with its central value and by comparing said subtraction signal with its mean value; an exclusive OR means for obtaining an exclusive OR output signal from said bi-leveled signals of the sum signal and the subtraction signal; a differential means for generating differential signals of respective phase signals generated in said signal generating means; a selecting means for selecting either of said differential signals of respective phase signals in response to said exclusive OR output signal; and a switching means for selectively outputting an output signal obtained from said selecting means or its inverted output signal having an opposite-polarity on the basis of the bi-leveled signal of said subtraction signal.

With this arrangement, a signal generating means (an encoder) generates the false sine-wave two-phase signals having a phase difference equal or close to 90 degrees with each other so as to correspond to the movement of the movable member to be speed-controlled. The sum signal and the subtraction signal of respective phase signals generated in said signal generating means (i.e. the encoder) are obtained. Then, the bi-leveled signals are produced by comparing these sum signal and subtraction signal with their mean values.

Subsequently, the exclusive OR output signal is obtained from the bi-leveled signals of the sum signal and the subtraction signal. The differential signals of respective phase signals generated in the signal generating means are obtained. Next, either of the differential signals of respective phase signals is selected by the exclusive OR output signal. And finally, a speed signal is outputted by selectively outputting an output signal obtained from the selecting means or its inverted output signal having the opposite-polarity on the basis of the bi-leveled signal of the subtraction signal.

Furthermore, a second aspect of the present invention provides a position control apparatus for positioning a movable object comprising: a signal generating means for generating false sine-wave two-phase signals having a phase difference equal or close to 90 degrees with each other so as to correspond to a movement of a movable member to be position-controlled; an adding means for obtaining a sum signal of respective phase signals generated in said signal generating means; a subtracting means for obtaining a subtraction signal of respective phase signals generated in said signal generating means; a comparing means for making bi-leveled signals by comparing said sum signal with its mean value and by comparing said subtraction signal with its mean value; an exclusive OR means for obtaining an exclusive OR output signal from said bi-leveled signals of the sum signal and the subtraction signal; a selecting means for selecting either of said respective phase signals in response to said exclusive OR output signal; a switching means for selectively outputting an output signal obtained from said selecting means or its inverted output signal having an opposite-polarity on the basis of the bi-leveled signal of said subtraction signal; an AC component inputting means for inputting an AC component of said output signal fed from the switching means to a sample and hold circuit; and a feedback means for returning an output of the sample and hold circuit, which holds a sample value inputted during a predetermined period of time in response to a building-up of said exclusive OR output signal, to its input terminal so as to realize a DC restoration.

With this arrangement, a signal generating means (an encoder) generates the false sine-wave two-phase signals having a phase difference equal or close to 90 degrees with each other so as to correspond to the movement of the movable member to be position-controlled. The sum signal and the subtraction signal of respective phase signals generated in said signal generating means (i.e. the encoder) are obtained. Then, the bi-leveled signals are produced by comparing these sum signal and subtraction signal with their mean values.

Subsequently, the exclusive OR output signal is obtained from the bi-leveled signals of the sum signal and the subtraction signal. Either of the respective phase signals is selected in response to the exclusive OR output signal. And, a signal is outputted by selectively outputting an output signal obtained from the selecting means or its inverted output signal having the opposite-polarity on the basis of the bi-leveled signal of the subtraction signal.

An AC component of said output signal fed from the switching means is inputted to a sample and hold circuit. And, a sample value inputted at the timing of a building-up of the exclusive OR output signal is held in the sample and hold circuit during a predetermined period of time in response to the building-up of the exclusive OR output signal. And, an output of the sample and hold circuit is returned to its input terminal so as to realize a DC restoration. Thus, it becomes possible to increase an error detecting range of the position signal within a time constant of the DC component restoration circuit, thereby generating a wide pull-in range for the position control.

The above and other objects, features and advantages of the present invention will become more apparent from the following detailed description which is to be read in conjunction with the accompanying drawings.

BRIEF DESCRIPTION OF THE DRAWINGS

FIGS. 2(a)–2(k) are wave form charts illustrating an operation of the speed control apparatus in accordance with the present invention;

FIGS. 6(a)–6(e) illustrate a shift direction change of a recording/reproducing head;

DETAIL DESCRIPTION OF THE PREFERRED EMBODIMENTS

Hereinafter, referring now to the accompanying drawings, embodiments of the present invention are explained in detail.

FIRST EMBODIMENT (SPEED CONTROL)

Figure 1:
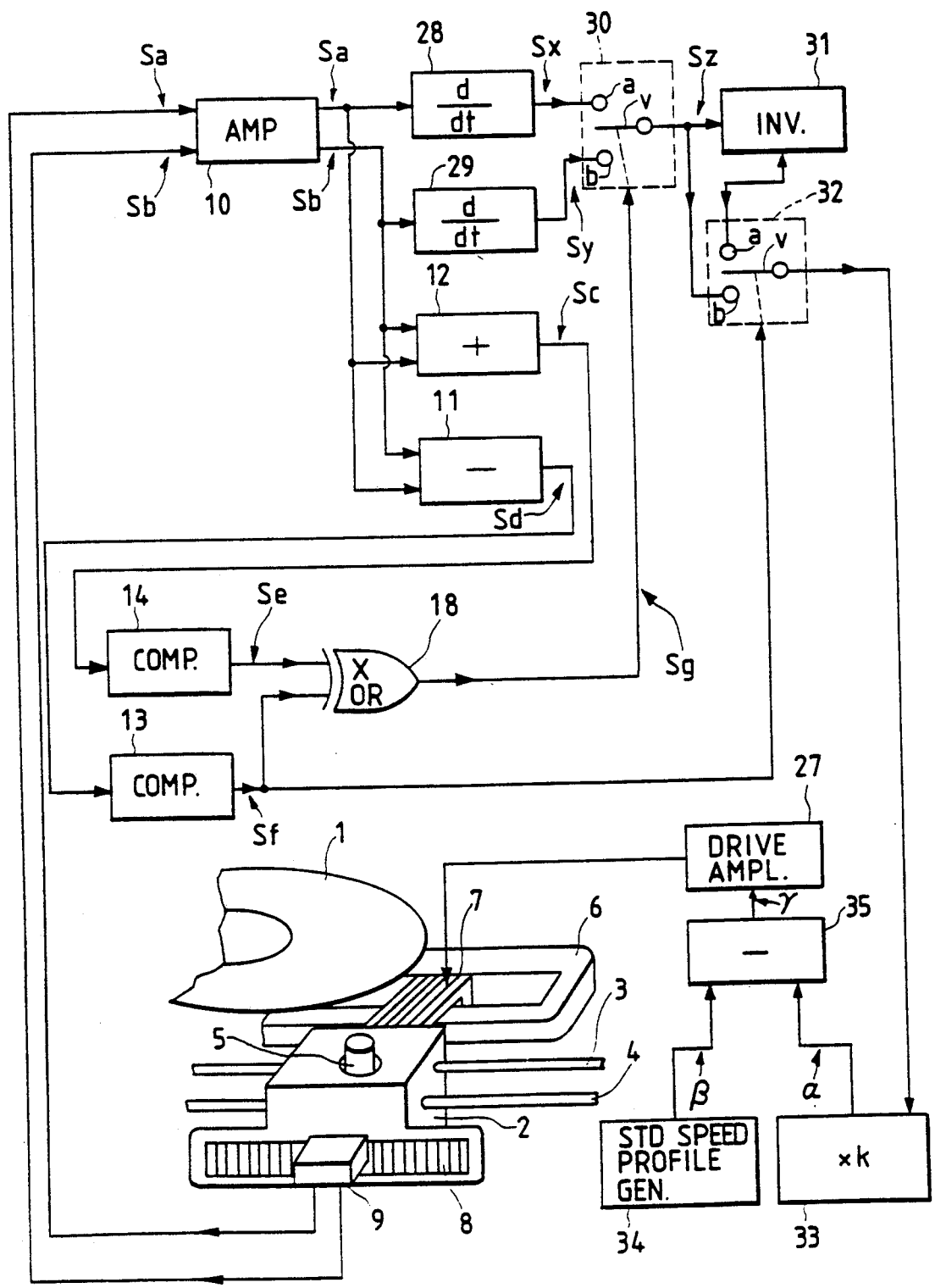
FIG. 1 is a schematic block diagram showing a constitution of a recording/reproducing apparatus of an optical disk embodied as a speed control apparatus in accordance with a first embodiment of the present invention.

With reference to FIGS. 1~3, a speed control apparatus for positioning a movable object in accordance with the present invention is explained in detail hereinafter. FIG. 1 is a schematic block diagram showing a constitution of a recording/reproducing apparatus of an optical disk embodied as one example of a speed control apparatus in accordance with the present invention. FIG. 2 is a wave form chart illustrating an operation of the speed control apparatus in accordance with the present invention.

In FIG. 1, a reference numeral 1 denotes an optical disk, and a reference numeral 2 denotes a carriage for an optical head. Reference numerals 3, 4 denote guide rods for restricting a shifting direction of the carriage 2. A reference numeral 5 denotes a lens (an objective lens) of the optical head, and a reference numeral 6 denotes a magnetic path member for a magnetic field generating apparatus in a linear motor for actuating the carriage 2. This magnetic path member 6 is fixed to a non-movable portion of the apparatus.

Further, a reference numeral 7 denotes an actuating coil of the linear motor. This actuating coil 7 is fixed to the carriage 2 so that the carriage 2 can be moved along the guide rods 3, 4 by an electromagnetic force interacting between the magnetic flux causing from the magnetic path member 6 and a current flowing in the actuating coil 7 crossing the magnetic flux.

The carriage 2 is equipped with an optical scale (linear scale) 8. A detecting sensor 9 provided on the non-movable portion of the apparatus generates, when the optical scale 8 shifts together with the carriage 2, false sine-wave two-phase signals Sa, Sb {Refer to (a) and (b) of FIG. 2} having a phase difference of a predetermined angle equal or close to 90 degrees. Then, the detecting sensor 9 supplies these two-phase signals to an amplifier 10. In other words, the optical scale (linear scale) 8 fixed to the carriage 2 and the detecting sensor 9 fixed to the non-movable portion of the apparatus constitute an encoder generating false sine-wave two-phase signals having a phase difference of a predetermined angle equal or close to 90 degrees. The phase difference is allowable if close to 90 degrees, however the best phase difference is 90 degrees and therefore a desirable embodiment of the present invention is set to 90 degrees.

After the false sine-wave two-phase signals Sa, Sb are amplified in the amplifier 10, the signal Sa is supplied to a differential circuit 28, an adder circuit 12, and a subtracter circuit 11 and the signal Sb is supplied to a differential circuit 29, the adder circuit 12, and the subtracter circuit 11.

The false sine-wave two-phase signals Sa, Sb are added in the adder circuit 12 and, in turn, supplied to a comparator 14 as a signal Sc (=Sa+Sb) shown by (c) in FIG. 2. On the other hand, the signals Sb is subtracted from the signal Sa to obtain a signal Sd (=Sa−Sb) shown by (d) in FIG. 2, and this signal Sd is supplied to a comparator circuit 13.

The comparator circuit 14 generates a bi-leveled signal Se {Refer to a signal shown by (e) of FIG. 2} by comparing the signal Sc and its mean value and sends it to an exclusive OR circuit 18. In the same way, the comparator circuit 13 generates a bi-leveled signal Sf {Refer to a signal shown by (f) of FIG. 2} by comparing the signal Sd and its mean value and sends it to the exclusive OR circuit 18. The bi-leveled signal Sf is also supplied to a changeover switch 32 as a changeover control signal.

The exclusive OR circuit 18 outputs a signal Sg shown by (g) of FIG. 2 as an exclusive OR result of two signals Se, Sf, and supplies it to a changeover switch 30 as a changeover control signal.

The differential circuit 28 outputs a differential signal Sx {Refer to a signal shown by (h)} and supplies it to a fixed contact "a" of the changeover switch 30. The differential circuit 29 outputs a differential signal Sy {Refer to a signal shown by (h)} and supplies it to a fixed contact "b" of the changeover switch 30.

The changeover switch 30 selectively connects its movable contact "v" to the fixed contact "a" or the other fixed contact "b" based on the output signal Sg {Refer to a signal (g) of FIG. 2}. As a result, a signal Sz shown by (j) of FIG. 2 is outputted from the movable contact "v".

Namely, when the output signal Sg from the exclusive OR circuit 18 is in an H-level, the changeover switch 30 is switched to connect the movable contact "v" with the fixed contact "a". Therefore, the differential signal Sx outputted from the differential circuit 28 is directly outputted as the signal Sz. On the contrary, when the output signal Sg from the exclusive OR circuit 18 is in an L-level, the changeover switch 30 is switched to connect the movable contact "v" with the fixed contact "b". Thus, the differential signal Sy outputted from the differential circuit 29 is directly outputted as the signal Sz.

The output signal Sz is supplied from the movable contact "v" of the changeover switch 30 to a fixed contact "b" of the changeover switch 32. The output signal Sz is also supplied from the movable contact "v" of the changeover switch 30 to a polarity inversion circuit 31a and, in turn, an output signal of the polarity inversion circuit 31a is supplied to a fixed contact "a" of the changeover switch 32.

Namely, when the output signal Sf from the comparator circuit 13 is in an H-level, the changeover switch 32 is switched to connect the movable contact "v" with the fixed contact "b". Therefore, the output signal Sz from the movable contact "v" of the changeover switch 30 is directly outputted through the changeover switch 32 and supplied to a gain setting circuit 33. On the contrary, when the output signal Sf from the comparator circuit 13 is in an L-level, the changeover switch 32 is switched to connect the movable contact "v" with the fixed contact "a". Therefore, the output signal Sz from the movable contact "v" of the changeover switch 30 is once supplied to the polarity inversion circuit 31. Then, after the signal Sz is inverted in the polarity inversion circuit 31 so as to have an opposite polarity, the inverted signal is supplied to the fixed contact "a" of the changeover switch 32, and subsequently supplied to the gain setting circuit 33.

Accordingly, the speed signal supplied from the movable contact "v" of the changeover switch 32 to the gain setting circuit 33 can include an information relating to a polarity of speed change. And, as shown by (k) of FIG. 2, thus obtained speed signal has a good linearity and includes no ripple component.

An output signal $\alpha$ from the gain setting circuit 33 is supplied to a subtracter circuit 35 as a subtraction signal. On the other hand, this subtracter circuit 35 is also supplied with an output signal $\beta$ from a standard speed profile generating circuit 34. The subtracter circuit 35 outputs a speed error signal $\gamma$ to a drive circuit 27 as a subtraction result in the subtracter circuit 35. An output signal of the drive circuit 27 is supplied to the actuating coil of the linear motor so as to execute a speed control operation.

By the way, a timing $t_0$ shown in FIG. 2 shows a turning point of the shift movement of the head.

Figure 3A:
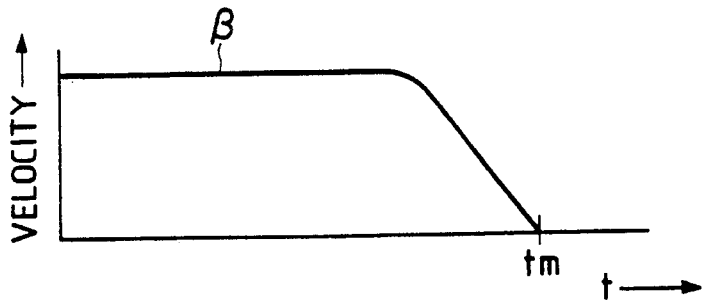
FIGS. 3(a)–3(c) are time charts showing conditions of signals $\alpha$, $\beta$, and $\gamma$.
Figure 3B:
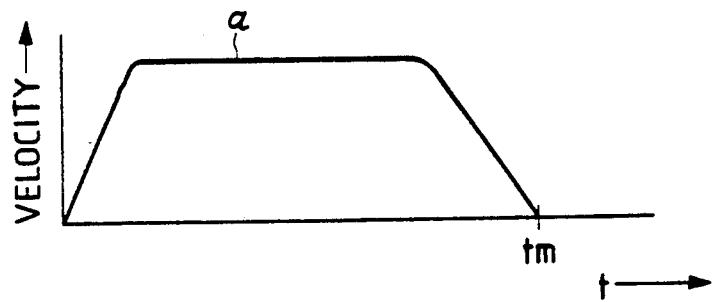
Figure 3C:
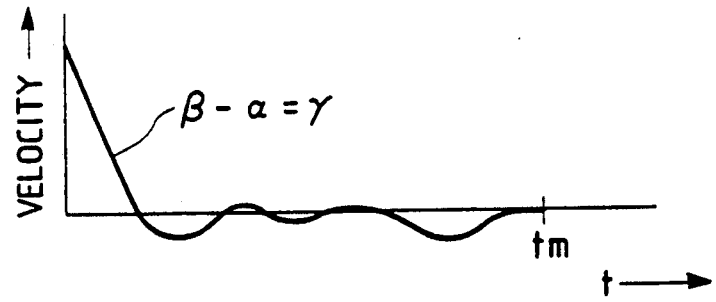
Figure 4:
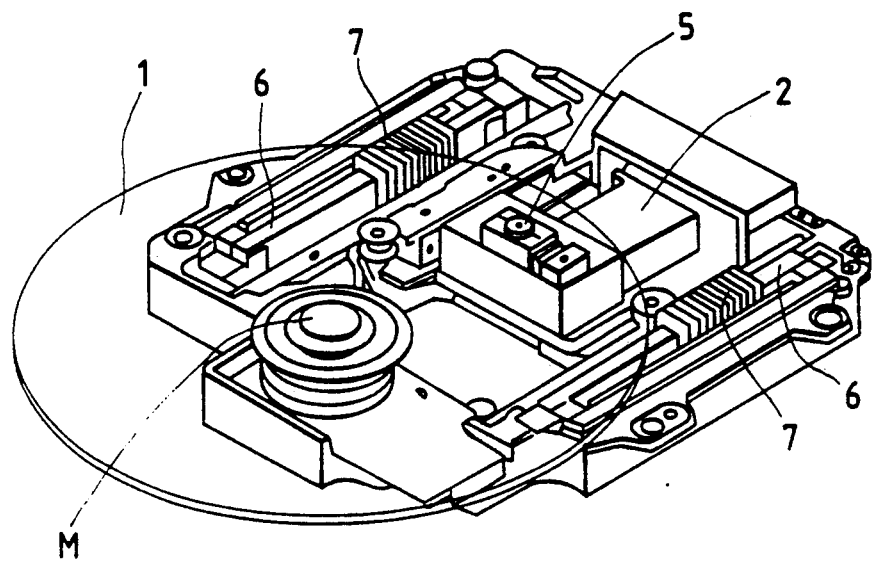
FIG. 4 is a perspective view showing a recording/reproducing apparatus of an optical disk embodied as one example of a recording/reproducing apparatus.
Figure 5A:
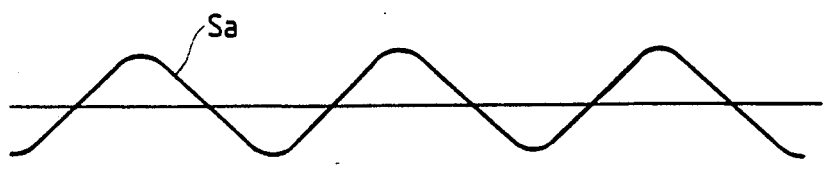
FIGS. 5(a)–5(f) illustrate a procedure for generating a speed signal in a conventional apparatus.
Figure 5B:
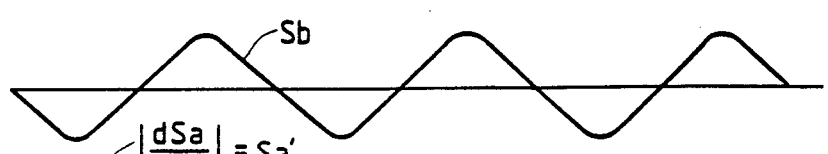
Figure 5C:
Figure 5D:
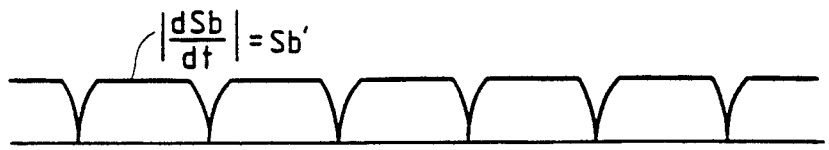
Figure 5E:
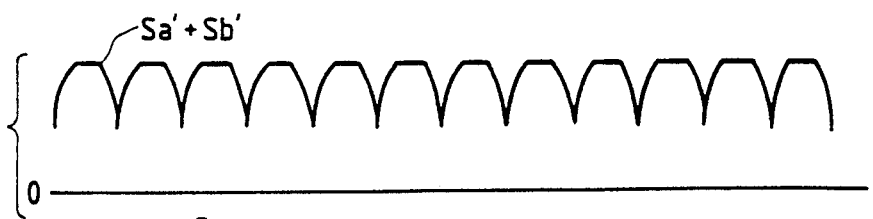
Figure 5F:
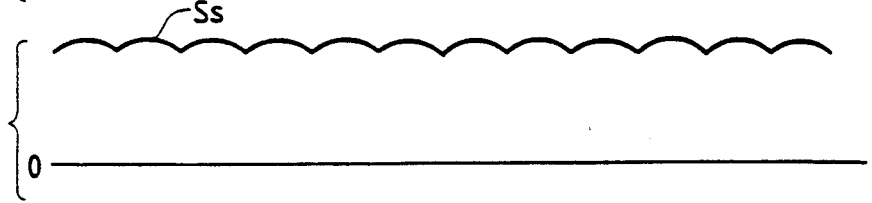

FIGS. 3(a)~3(c) are time charts showing the condition of the signals $\alpha$, $\beta$, and $\gamma$.

As is apparent from the foregoing description, in accordance with the speed control apparatus of this embodiment, the encoder generates the false sine-wave two-phase signals having a phase difference equal or close to 90 degrees with each other so as to correspond to the movement of the movable member to be speed-controlled. The sum signal and the subtraction signals of respective phase signals generated in the encoder are obtained. Then, the bi-leveled signals are produced by respectively comparing these sum and subtraction signals with their mean values.

Subsequently, the exclusive OR output signal is obtained from the bi-leveled signals of the sum signal and the subtraction signal. The differential signals of respective phase signals generated in the encoder are obtained. Next, either of the differential signals of respective phase signals is selected by the exclusive OR output signal. And finally, a speed signal is outputted by selectively outputting an output signal obtained from the selecting means or its inverted output signal having the opposite-polarity on the basis of the bi-leveled subtraction signal.

Accordingly, thus obtained speed signal includes the information relating to the polarity of speed change. And, this speed signal has a good linearity and includes no ripple component. Thus, this embodiment of the present invention can solve the previously described problems and disadvantages encountered in the conventional art.

SECOND EMBODIMENT (POSITION CONTROL)

Hereinafter, a position control apparatus for a movable object in accordance with the present invention is explained in detail, with reference to accompanying drawings.

Figure 7:
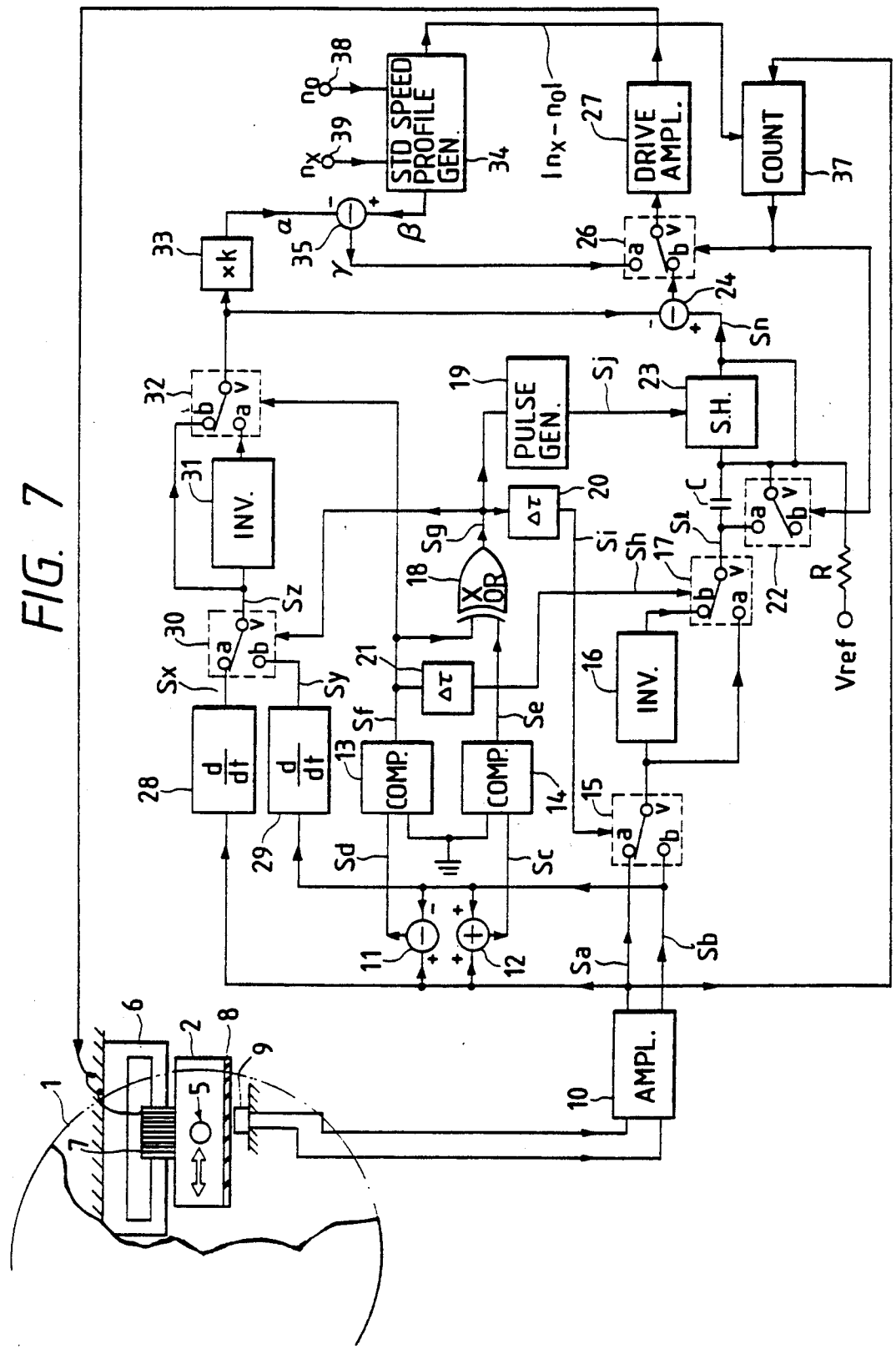
FIG. 7 is a block diagram showing a schematic constitution of the position control apparatus in accordance with a second embodiment of the present invention applied to a recording/reproducing apparatus of an optical disk.
Figure 8:
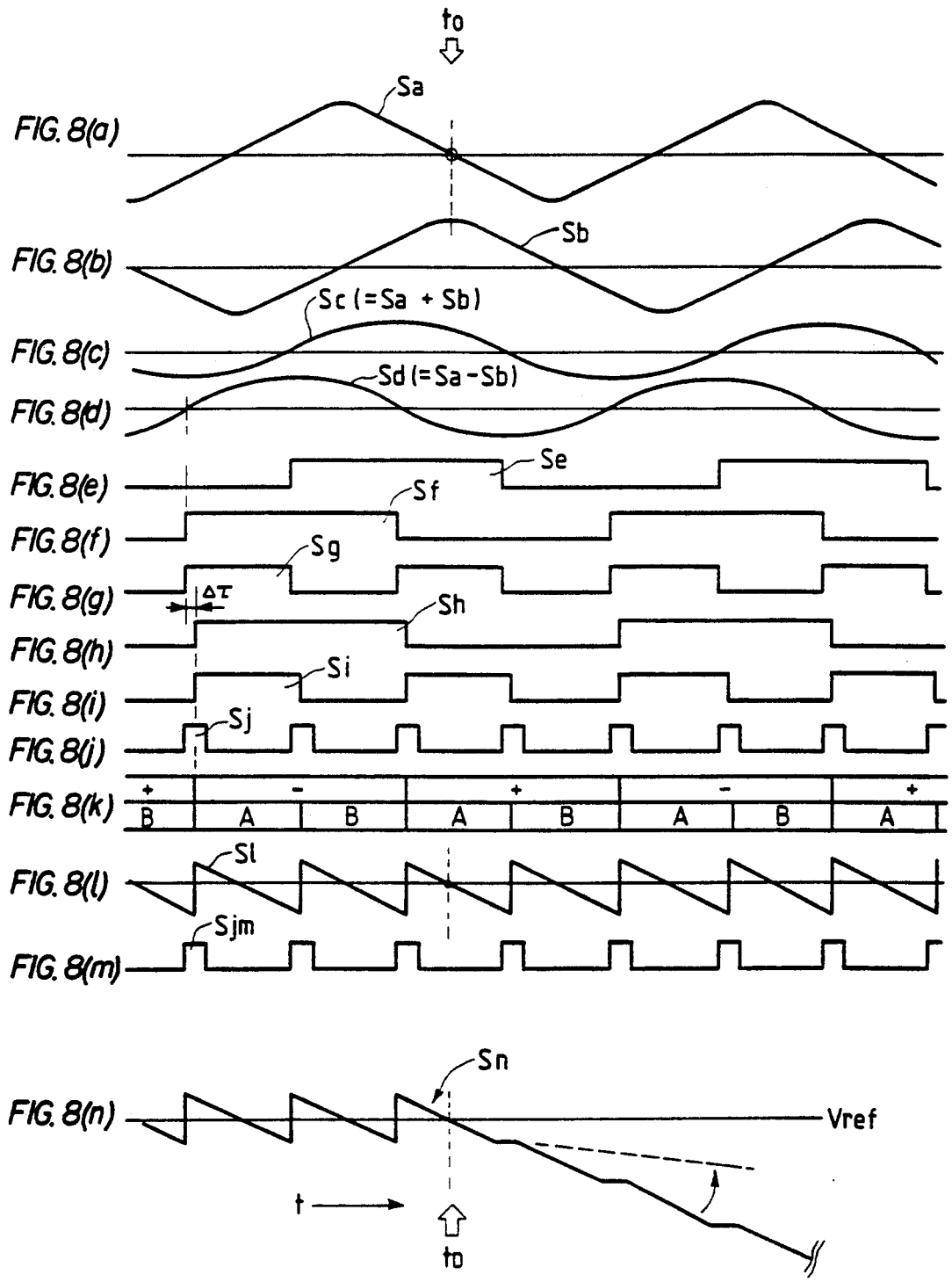
FIGS. 8(a)–8(n) are wave form charts illustrating an operation of the position control apparatus for a movable object in accordance with the second embodiment; and, FIG. 9 is a view illustrating a position detecting operation in a conventional apparatus.
Figure 9:
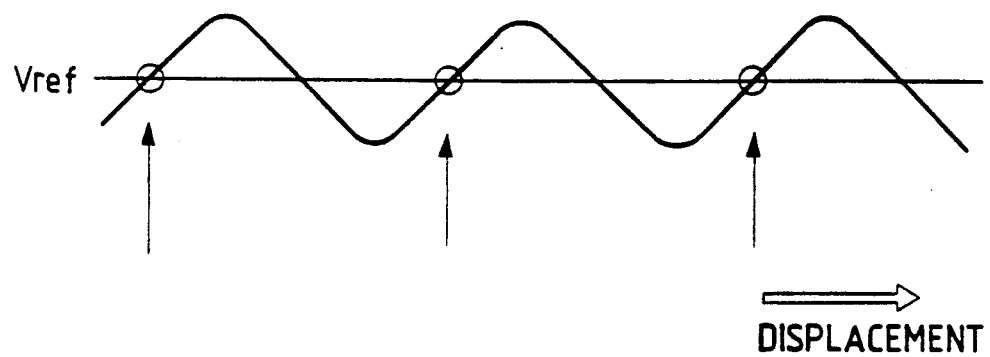

FIG. 7 is a block diagram showing a schematic constitution of the embodiment of the position control apparatus applied to a recording/reproducing apparatus of an optical disk. FIG. 8 is a wave form chart illustrating an operation of the position control apparatus for a movable object in accordance with the present invention.

In FIG. 7, a reference numeral 1 denotes an optical disk, and a reference numeral 2 denotes a carriage for an optical head. A reference numeral 5 denotes a lens (an objective lens) of the optical head, and a reference numeral 6 denotes a magnetic path member for a magnetic field generating apparatus in a linear motor for actuating the carriage 2. This magnetic path member 6 is fixed to a non-movable portion of the apparatus.

Further, a reference numeral 7 denotes an actuating coil of the linear motor. This actuating coil 7 is fixed to the carriage 2 so that the carriage 2 can be moved along the guide rods (not shown) by an electromagnetic force interacting between the magnetic flux causing from the magnetic path member 6 and a current flowing in the actuating coil 7.

The carriage 2 is equipped with an optical scale (linear scale) 8. A detecting sensor 9 provided on the non-movable portion of the apparatus generates, when the optical scale 8 shifts together with the carriage 2, false sine-wave two-phase signals Sa, Sb {Refer to (a) and (b) of FIG. 8} having a phase difference of a predetermined angle equal or close to 90 degrees. Then, the detecting sensor 9 supplies these two-phase signals to an amplifier 10. In other words, the optical scale (linear scale) 8 fixed to the carriage 2 and the detecting sensor 9 fixed to the non-movable portion of the apparatus constitute an encoder generating false sine-wave two-phase signals having a phase difference of a predetermined angle equal or close to 90 degrees. The phase difference is allowable if close to 90 degrees, however the best phase difference is 90 degrees and therefore a desirable embodiment of the present invention is set to 90 degrees.

In FIG. 7, switches 22, 26 are controlled by a counter 37 in such a manner that a speed control operation is carried out when these switches 22, 26 are connected to their fixed contacts "a" and, on the other hand, a position control operation is carried out when these switches 22, 26 are connected to their fixed contacts "b".

If it is supposed that a trace of a track $n_0$ is now carried out, the apparatus executes the position control operation and a head is servo-locked to the track $n_0$. And further, the carriage 2 is stopped, and an output of the drive circuit 27 is zero. A standard speed profile generator 34 is fed a track number $n_0$ from a reproducing circuit (not shown).

Then, if an access to a $n_X$ is newly executed from above condition, an access track number $n_X$ is supplied together with an access command to the standard speed profile generator 34. The standard speed profile generator 34 outputs a predetermined time-versus-speed pattern $\beta$ to a subtracter 35 in accordance with a difference between $n_0$ and $n_X$, and also outputs a track difference $|n_X - n_0|$ to the counter 37 so as to set a counter.

The counter 37 outputs a changeover signal to both of the switches 22, 26 in response to the set command. Thus, the switches 22, 26 are switched over to respective "a" contacts to initiate the speed control operation. Since the carriage 2 is in a stopped condition at the beginning, the other input of the subtracter 35 is zero. Therefore, an output $\beta$ of the standard speed profile generator 34 is directly outputted without any modification trough the drive circuit 27 to the actuating coil 7. Thus, the carriage 2 is shifted at a high speed toward the target track $n_x$.

In response to the shift movement of the carriage 2, the detecting sensor 9 outputs two signals having a mutual phase difference of 90 degrees and having a cycle equal to a length of track pitch. These signals are outputted through the amplifier 10 as shown by (a), (b) in FIG. 8.

The output signal Sa is supplied to a subtracter 11, an adder 12, a differential circuit 28, a fixed contact "a" of the switch 15, and a counter 37, and the output signal Sb is supplied to the subtracter 11, the adder 12, a differential circuit 29, and a fixed contact "b" of the switch 15.

As a result, as is explained in the previous embodiment, a signal representing a shifting speed of the carriage 2 is obtained from a switch 32. This speed signal (Refer to (k) of FIG. 2) is multiplied by a predetermined coefficient in a gain setting circuit 33 and, then, is supplied to a subtracter 35 as a signal a. Accordingly, an input to a drive circuit 27 becomes a difference signal $\gamma$ between the initial speed setting value $\beta$ and the signal a representing an actual speed. Therefore, the carriage 2 decelerates so as to approach the target track $n_x$, as shown in FIG. 3.

Meanwhile, the counter 37 counts a wave number (i.e. a track number having been sent) of the signal Sa until the timing of its counting value becomes equal to the set value $|n_x-n_0|$; i.e. the target track position, and outputs a reset signal. And, in turn, the switches 22, 26 are switched over to their fixed contacts "b" (at the timing "$t_0$"). Then, the apparatus proceeds to a position control operation.

Hereinafter, a signal applied to the contact "b" of the switch 26 at this moment is explained. A movable switch 15 of the changeover switch 15 is not only connected to the fixed contact "a" of the changeover switch 17 but connected to a polarity inversion circuit 16. A movable contact "v" of the changeover switch 15 is connected to the fixed contact "a" when a signal Si {Refer to a signal shown by (i) of FIG. 8} outputted from a later-described delay circuit 20 is in an H-level condition. Therefore, the signal Sa is outputted from the movable contact "v". On the other hand, the movable contact "v" of the changeover switch 15 is connected to the fixed contact "b" when the signal Si is in an L-level condition. Thus, the signal Sb is outputted from the movable contact "v".

An output signal from the inversion circuit 16 is supplied to a fixed contact "b" of the changeover switch 17. A movable contact "v" of the changeover switch 17 is connected to a capacitor C adopted as an AC coupling circuit and to a fixed contact "a" of the changeover switch 22.

The movable contact "v" of the changeover switch 15 is connected to the fixed contact "b" when a signal Sh outputted from a later-described delay circuit 21 {Refer to a signal shown (h) of FIG. 8} is in an H-level condition. To the contrary, the movable contact "v" of the changeover switch 15 is connected to the fixed contact "a" when the signal Sh is in an L-level condition.

Both the capacitor C and a movable contact "v" of the switch 22 are connected to an input contact of a sample and hold circuit 23. The input terminal of the sample and hold circuit 23 is not only connected through a resistance R to a reference voltage source $V_{ref}$ but connected to an input terminal of a subtraction circuit 24, which is also applied with an output signal of the sample and hold circuit 23 as a subtraction signal.

In the case where the switch 22 is connected to the fixed contact "b", above-described components such as the capacitor C, the resistance R, the reference voltage source $V_{ref}$, and the sample and hold circuit 23 function as follows. That is, when an AC signal is supplied to the input terminal of the sample and hold circuit 23 through the capacitor C serving as the AC coupling circuit, the AC signal is again included with a DC component. (i.e. DC restoration)

The sample and hold circuit 23 is supplied with an input signal as a sample value when a signal Sjm is in an L-level. Hereupon, the L-level duration of the signal Sjm corresponds to that of a signal Sj as shown by (j) and (m) of FIG. 8. On the other hand, when the signal Sjm which corresponds to the signal Sj is in an H-level, the sample and hold circuit 23 holds the sample value inputted at the timing the signal Sj is changed from the L-level to the H-level.

The subtracter circuit 24 is supplied with a signal outputted from a movable contact "v" of a later-described changeover switch 32. An output signal of the subtracter circuit 24 is supplied to a fixed contact "b" of the changeover switch 26. A fixed contact "a" of the same changeover switch 26 is supplied with a speed control signal $\gamma$ outputted from a later-described subtracter circuit 35.

The differential circuit 28, which is supplied with a signal Sa from an output terminal of the amplifier 10, sends out its output signal to a fixed contact "a" of the changeover switch 30. The differential circuit 29, which is supplied with a signal Sb from the output terminal of the amplifier 10, sends out its output signal to a fixed contact "b" of the changeover switch 30. The changeover switch 30 is selectively changed over between its fixed contacts "a" and "b" based on an output signal Sg {Refer to (g) of FIG. 8} from a later-described exclusive OR circuit 18.

A signal outputted from the movable contact "v" of the changeover switch 30 is supplied to a fixed contact "b" of the changeover switch 32, and also, supplied to a fixed contact "a" of the changeover switch 32 through a polarity inversion circuit 31. The movable contact "v" of the changeover switch 32 is selectively changed over between the fixed contacts "a" and "b" in response to a signal Sf {Refer to a signal shown by (f) of FIG. 8} outputted from a later-described comparator circuit 13.

In the case where the movable contact "v" of the changeover switch 26 is connected to the fixed contact "a" so that the circuit shown in FIG. 7 can be arranged to execute the speed control operation, a speed control signal outputted from the movable contact "v" of the changeover switch 26 is supplied to the drive circuit 27. Therefore, the output signal of the drive circuit 27 is supplied to the actuating coil 7 of the linear motor to carry out the speed control operation.

On the contrary, in the case where the movable contact "v" of the changeover switch 26 is connected to the fixed contact "b" so that the circuit shown in FIG. 7 can be arranged to execute the position control operation, a position control signal outputted from the movable contact "v" of the changeover switch 26 is supplied to the drive circuit 27. Thus, the output signal of the drive circuit 27 is finally supplied to the actuating coil 7 of the linear motor to carry out the position control operation.

The false sine-wave two-phase signals Sa, Sb outputted from the amplifier 10, which are outputted from the detecting sensor 9 of the encoder in response to the shift movement of the objective lens 5 of the optical head so as to have a phase difference equal or close to 90 degrees, are added in the adder circuit 12 and, in turn, supplied to a comparator 14 as a signal Sc (=Sa+Sb) shown by (c) in FIG. 8. On the other hand, the signals Sb is subtracted from the signal Sa to obtain a signal Sd (=Sa−Sb) shown by (d) in FIG. 8, and this signal Sd is supplied to a comparator circuit 13.

The comparator circuit 14 generates a bi-leveled signal Se {Refer to a signal shown by (e) of FIG. 8} by comparing the signal Sc and its mean value and sends it to the exclusive OR circuit 18. In the same way, the comparator circuit 13 generates a bi-leveled signal Sf {Refer to a signal shown by (f) of FIG. 8} by comparing the signal Sd and its mean value and sends it to the exclusive OR circuit 18 and the delay circuit 21. And further, as is already described, the bi-leveled signal Sf is also supplied to the changeover switch 32 as a changeover control signal.

The exclusive OR circuit 18 outputs a signal Sg shown by (g) of FIG. 8 as an exclusive OR result of two signals Se, Sf, and supplies it to a pulse generator circuit 19 and a delay circuit 20. And further, as is already described, the signal Sg is also supplied to the changeover switch 30 as a changeover control signal.

The pulse generating circuit 19 generates a pulse signal Sj {Refer to a signal shown by (j) of FIG. 8} having a predetermined width in response to a building up of the signal Sg. This pulse signal Sj is given to the sample and hold circuit 23 as a sample pulse or a hold pulse as is already described.

The delay circuit 20 delays the inputted signal Sg by a predetermined time and outputs a signal Si {Refer to a signal shown by (i) of FIG. 8} to the changeover switch 15 as a changeover control signal. On the other hand, the delay circuit 21 delays the inputted signal Sf by a predetermined time and outputs a signal Sh {Refer to a signal shown by (h) of FIG. 8} to the changeover switch 17 as a changeover control signal.

The changeover switch 15 is controlled by the signal Si in such a manner the movable contact "v" is connected to the fixed contact "a" when the signal Si is in a H-level condition and the movable contact "v" is connected to the fixed contact "b" when the signal Si is in an L-level condition. Therefore, only the straight portions of the two signals Sa, Sb are outputted from the movable contact "v" of the changeover switch 15. This signal is on one hand directly supplied to the fixed contact "a" of the changeover switch 17 and is on the other hand supplied to the polarity inversion circuit 16 so as to supply the inverted signal having an opposite polarity to the fixed contact "b" of the changeover switch 17.

The changeover switch 17 is controlled by the signal Sh in such a manner the movable contact "v" is connected to the fixed contact "a" when the signal Sh is in an L-level condition and the movable contact "v" is connected to the fixed contact "b" when the signal Sh is in an H-level condition. Therefore, a signal shown by (1) of FIG. 8 is outputted from the movable contact "v" of the changeover switch 17.

FIG. 8(k) illustratively shows how the signal S1 is formed through the above-described switching operation of the changeover switches 15 and 17. In a region A of FIG. 8(k), the changeover switch 15 is situated to received the signal Sa. Namely, the moveable contact "v" of the changeover switch 15 is connected to the fixed contact "a". On the contrary, in a region B of FIG. 8(k), the changeover switch 15 is situated to receive the signal Sb. Namely, the movable contact "v" of the changeover switch 15 is connected to the fixed contact "b". Furthermore, in a section denoted by "+" of FIG. 8(k), the changeover switch 17 is situated to directly receive the signal having been selected by the switch 15. Namely, movable contact "v" of the changeover switch 17 is connected to the fixed contact "a". On the other hand, in a section denoted by "−", the changeover switch 17 is situated to receive an inverted signal through the polarity inversion circuit 16. Namely, the movable contact "v" of the changeover switch 17 is connected to the fixed contact "b".

The signal S1 is characterized in that the straight portions of the false sine-wave two-phase signals Sa, Sb are partly extracted and obliquely arrayed in the same direction on a time axis.

In the case where the changeover switch 22 is switched to the fixed contact "a" (i.e. a condition corresponding to a left side of the timing "$t_0$" of FIG. 8), the capacitor C is shunted. Therefore, the signal S1 is directly outputted to the subtracter circuit 24 without any modification. On the other hand, in the case where the changeover switch 22 is switched to the fixed contact "b" (i.e. a condition corresponding to a right side of the timing "$t_0$" of FIG. 8), the signal S1 is supplied to the sample and hold circuit 23 through the capacitor C serving as the AC coupling circuit. Therefore, the input terminal of the sample and hold circuit 23 is supplied with only a AC component of the signal S1.

As described previously, the input terminal of the sample and hold circuit 23 is connected through the resistance R to the reference voltage source $V_{ref}$. And, the output terminal of the sample and hold circuit 23 is connected on one hand to the input terminal of the sample and hold circuit 23 and connected on the other hand to the input terminal of the subtraction circuit 24. Therefore, the AC component of the signal S1 supplied through the capacitor C to the input terminal of the sample and hold circuit 23 is again included a DC component by means of the circuit consisting of the capacitor C, the resistance R, and the standard voltage $V_{ref}$ for a position error and also by means of the sample and hold circuit.

The sample and hold circuit 23 is supplied with the signal S1 as a sample value when the signal Sjm is in an L-level. As described above, the L-level duration of the signal Sjm corresponds to that of a signal Sj outputted from the pulse generating circuit 19. On the other hand, when the signal Sjm which corresponds to the signal Sj is in an H-level, the sample and hold circuit 23 holds the sample value of the signal S1 inputted at the timing the signal Sj is changed from the L-level to the H-level.

Since the sample and hold circuit 23 is shunted, segments of S1 are successively added to the voltage sampled by the signal Sjm so as to obtain a position error detecting signal having a monotonous slope as shown by (n) of FIG. 8. This shows that an error detecting range is largely enlarged compared with a conventional method which utilizes one output signal from the encoder (e.g. signal Sa) as a position error detecting signal. Accordingly, even if the carriage 2 has too large speed to stop the target track at the timing $t_0$ and therefore passes over the target track too widely, it becomes possible to pull the carriage 2 in the target track.

In order to increase position error detecting range as above, holding a voltage sampled by the signal Sjm in the capacitor C is a mandatory thing. However, the capacitor C is discharged through the resistance R and approaches the standard voltage $V_{ref}$. Therefore, as shown by a broken line in FIG. 8(n), the inclination of the slope does not become so steep than expected. But, as long as its inclination is kept to be the same direction, it serves as the position detecting signal. Therefore, if the time constant of this CR circuit is carefully selected to be not less than the time required for converging the carriage 2, no problem would occur. (The time required for converging the carriage 2 is normally less than a second.)

In accordance with the method explained above, the position detecting range during the position control operation; i.e. the pull-in range of the position control, can be fairly increased. Thus, the speed control in the track access becomes easy. Therefore, it becomes possible to increase a track access speed so as to functionally improve the apparatus.

An application of the speed control and position control explained in the foregoing description are not limited to a recording/reproducing head of the optical disk. Therefore, for example, these controls can be applied to a speed/position control of a linearly shifting object using an encoder such as a magnetic head control of HDD.

As apparent from the foregoing description, this invention may be widely applied to a moving object having such an encoder as generates the two-phase false sine-wave signals having a phase difference equal to 90 degrees with each other. For example, in the case of a DC motor equipped with a rotary encoder which generates above-described two-phase signals corresponding with its rotation, a rotating speed and/or a rotating angle of the DC motor may be controlled in the same manner.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A speed control apparatus for positioning a movable object comprising:
   signal generating means for generating false sine-wave two-phase signals having a phase difference equal or close to 90 degrees with each other so as to correspond to a movement of a movable member to be speed-controlled;
   adding means for obtaining a sum signal of respective phase signals generated in said signal generating means;
   subtracting means for obtaining a subtraction signal of respective phase signals generated in said signal generating means;
   comparing means for making bi-leveled signals by comparing said sum signal with its mean value and by comparing said subtraction signal with its mean value;
   exclusive OR means for obtaining an exclusive OR output signal from said bi-leveled signals of the sum signal and the subtraction signal;
   differential means for generating differential signals of respective phase signals generated in said signal generating means;
   selecting means for selecting either of said differential signals of respective phase signals in response to said exclusive OR output signal; and
   switching means for selectively outputting an output signal obtained from said selecting means or its inverted output signal having an opposite-polarity on the basis of the bi-leveled signal of said subtraction signal.

2. A position control apparatus for positioning a movable object comprising:
   signal generating means for generating false sine-wave two-phase signals having a phase difference equal or close to 90 degrees with each other so as to correspond to a movement of a movable member to be position-controlled;
   adding means to obtaining a sum signal of respective phase signals generated in said signal generating means;
   subtracting means for obtaining a subtraction signal of respective phase signals generated in said signal generating means;
   comparing means for making bi-leveled signals by comparing said sum signal with its mean value and by comparing said subtraction signal with its mean value;
   exclusive OR means for obtaining an exclusive OR output signal from said bi-leveled signals of the sum signal and the subtraction signal;
   selecting means for selecting either of said respective phase signals in response to said exclusive OR output signal;
   switching means for selectively outputting an output signal obtained from said selecting means or its inverted output signal having an opposite-polarity on the basis of the bi-leveled signal of said subtraction signal;
   AC component inputting means for inputting an AC component of said output signal fed from the switching means to a sample and hold circuit; and
   feedback means for returning an output of the sample and hold circuit, which holds a sample value inputted during a predetermined period of time in response to a building-up of said exclusive OR output signal, to its input terminal so as to realize a DC restoration.

3. A speed and position control apparatus for positioning a movable object comprising:
   signal generating means for generating false sine-wave two-phase signals having a phase difference equal or close to 90 degrees with each other so as to correspond to a movement of a movable member to be speed- or position-controlled;
   adding means for obtaining a sum signal of respective phase signals generated in said signal generating means;
   subtracting means for obtaining a subtraction signal of respective phase signals generated in said signal generating means;
   comparing means for making bi-leveled signals by comparing said sum signal with its mean value and by comparing said subtraction signal with its mean value;
   exclusive OR means for obtaining an exclusive OR output signal from said bi-leveled signals of the sum signal and the subtraction signal;

differential means for generating differential signals of respective phase signals generated in said signal generating means;

first selecting means for selecting either of said differential signals of respective phase signals in response to said exclusive OR output signal;

first switching means for selectively outputting an output signal obtained from said first selecting means or its inverted output signal having an opposite-polarity on the basis of the bi-leveled signal of said subtraction signal;

second selecting means for selecting either of said respective phase signals in response to said exclusive OR output signal;

second switching means for selectively outputting an output signal obtained from said second selecting means or its inverted output signal having an opposite-polarity on the basis of the bi-leveled signal of said subtraction signal;

AC component inputting means for inputting an AC component of said output signal fed from the second switching means to a sample and hold circuit; and feedback means for returning an output of the sample and hold circuit, which holds a sample value inputted during a predetermined period of time in response to a building-up of said exclusive OR output signal, to its input terminal so as to realize a DC restoration.

4. An apparatus selectively executing a speed control operation or a position control operation for a recording/reproducing head on the basis of a distance between a target position and an actual head position in the case where the recording/reproducing head is linearly shifted with respect to a disk-shaped recording medium so as to position the recording/reproducing head to the target position on the recording medium, said apparatus comprising:

encoder for generating false sine-wave two-phase signals having a phase difference equal to or close to 90 degrees with each other so as to correspond to a movement of a recording/reproducing head;

speed detecting means for detecting an actual shifting speed of the recording/reproducing head during the speed control operation;

speed control signal generating means for generating a speed control signal on the basis of a difference between the actual shifting speed obtained from said speed detecting means and a head speed pattern interrelated with a distance between an actual position of the head and the target position;

switching means for detecting a shifting distance of the recording/reproducing head based on a signal fed from either of said two phase-signals and switching, in response to this detected shifting distance, an operational condition from the speed control operation to the position control operation shortly before the recording/reproducing head approaches the target position; and enlarging means for enlarging, within a predetermined period of time immediately after the operational condition has been changed from the speed control operation to the position control operation, a detecting range of an error voltage for the position control operation to be greater than a minimum pitch detected by the encoder.

5. An apparatus in accordance with claim 4 further comprising:

adding means for obtaining a sum signal of respective phase signals generated in said encoder;

subtracting means for obtaining a subtraction signal of respective phase signals generated in said encoder;

comparing means for making bi-leveled signals by comparing said sum signal with its mean value and by comparing said subtraction signal with its mean value;

exclusive OR means for obtaining an exclusive OR output signal from said bi-leveled signals of the sum signal and the subtraction signal;

differential means for generating differential signals of respective phase signals generated in said encoder;

selecting means for selecting either of said differential signals of respective phase signals in response to said exclusive OR output signal; and switching means for selectively outputting an output signal obtained from said selecting means or its inverter output signal having an opposite-polarity on the basis of the bi-leveled signal of said subtraction signal.

6. An apparatus in accordance with claim 4 in which said enlarging means further includes:

first comparing means for making a first bi-leveled signal by comparing a sum signal obtained by adding said two-phase signals of the encoder with its mean value;

second comparing means for making a second bi-leveled signal by comparing a subtraction signal obtained by subtracting said two-phase signals of the encoder with its mean value;

exclusive OR means for obtaining an exclusive OR output signal from said first and second bi-leveled signals;

first switching means for selectively outputting said two-phase signals in response to the exclusive OR output signal;

second switching means for selectively outputting an output signal obtained from said first switching means or its inverted output signal having an opposite-polarity in response to the second bi-leveled signal; and means constituted by a sample and hold circuit which inputs an output signal of said second switching means through a capacitor and a position error standard voltage through a resistance, and returning a sampled voltage sampled by a sample pulse in response to a building-up of said exclusive OR output signal to an input terminal of the sample and hold circuit to hold it in a capacitor, so that an AC component of said second switching means and the voltage held in the capacitor can be successively integrated.

* * * * *